(12) United States Patent
Witmer et al.

(10) Patent No.: US 12,204,155 B2
(45) Date of Patent: Jan. 21, 2025

(54) CHIP-TO-CHIP OPTICAL COUPLING FOR PHOTONIC INTEGRATED CIRCUITS

(71) Applicant: Apple Inc., Cupertino, CA (US)

(72) Inventors: Jeremy D. Witmer, San Jose, CA (US); Alfredo Bismuto, Sunnyvale, CA (US); Jeffrey T. Hill, Los Altos, CA (US); Junkyo Suh, Santa Clara, CA (US); Yigit O. Yilmaz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/850,828

(22) Filed: Jun. 27, 2022

(65) Prior Publication Data
US 2023/0102967 A1 Mar. 30, 2023

Related U.S. Application Data

(60) Provisional application No. 63/247,992, filed on Sep. 24, 2021.

(51) Int. Cl.
*G02B 6/42* (2006.01)

(52) U.S. Cl.
CPC .................. *G02B 6/423* (2013.01)

(58) Field of Classification Search
CPC .............. G02B 6/423; G02B 6/4231
See application file for complete search history.

(56) References Cited

U.S. PATENT DOCUMENTS

| | | | |
|---|---|---|---|
| 4,227,091 A | 10/1980 | Sick | |
| 4,318,058 A | 3/1982 | Mito | |
| 4,880,304 A | 11/1989 | Jaeb | |
| 4,896,325 A | 1/1990 | Coldren | |
| 5,140,605 A | 8/1992 | Paoli | |
| 5,159,700 A * | 10/1992 | Reid | G02B 6/43 257/E31.095 |
| 5,287,376 A | 2/1994 | Paoli | |
| 5,319,725 A * | 6/1994 | Buchmann | G02B 6/43 385/14 |
| 5,325,392 A | 6/1994 | Tohmori | |

(Continued)

FOREIGN PATENT DOCUMENTS

| | | |
|---|---|---|
| CN | 1173226 A | 2/1998 |
| CN | 1416533 A | 5/2003 |

(Continued)

OTHER PUBLICATIONS

He et al., "Integrated Polarization Compensator for WDM Waveguide Demultiplexers," IEEE Photonics Technology Letters vol. 11, No. 2, Feb. 1999, pp. 224-226.

(Continued)

*Primary Examiner* — Michelle R Connelly

(74) *Attorney, Agent, or Firm* — Brownstein Hyatt Farber Schreck, LLP

(57) ABSTRACT

A photonic integrated circuit including multiple elements formed by different processes onto separate chips can be manufactured by defining, via photolithography processes for example, complementary geometries onto each separate chip. Thereafter, the complementary geometries can be aligned and engaged, thereby optically and mechanically intercoupling the several chips to define a single photonic integrated circuit.

15 Claims, 8 Drawing Sheets

(56) References Cited

U.S. PATENT DOCUMENTS

| | | | |
|---|---|---|---|
| 5,341,391 A | 8/1994 | Ishimura | |
| 5,384,797 A | 1/1995 | Welch | |
| 5,483,261 A | 1/1996 | Yasutake | |
| 5,488,204 A | 1/1996 | Mead et al. | |
| 5,515,391 A | 5/1996 | Endriz | |
| 5,574,561 A * | 11/1996 | Boudreau | G01B 5/0004 |
| | | | 356/399 |
| 5,695,520 A | 12/1997 | Bruckner et al. | |
| 5,708,674 A | 1/1998 | Berrnink | |
| 5,742,631 A | 4/1998 | Paoli | |
| 5,780,875 A | 7/1998 | Tsuji | |
| 5,825,352 A | 10/1998 | Bisset et al. | |
| 5,835,079 A | 11/1998 | Shieh | |
| 5,850,411 A | 12/1998 | Major, Jr. | |
| 5,880,411 A | 3/1999 | Gillespie et al. | |
| 5,898,806 A * | 4/1999 | Nishimoto | G02B 6/4231 |
| | | | 385/52 |
| 5,915,165 A | 6/1999 | Sun | |
| 6,043,104 A | 3/2000 | Uchida | |
| 6,160,936 A * | 12/2000 | You | G02B 6/30 |
| | | | 385/52 |
| 6,188,391 B1 | 2/2001 | Seely et al. | |
| 6,250,819 B1 * | 6/2001 | Porte | G02B 6/423 |
| | | | 385/88 |
| 6,263,222 B1 | 7/2001 | Diab | |
| 6,310,610 B1 | 10/2001 | Beaton et al. | |
| 6,323,846 B1 | 11/2001 | Westerman et al. | |
| 6,341,116 B1 | 1/2002 | Lee | |
| 6,345,135 B1 | 2/2002 | Reid | |
| 6,373,872 B2 | 4/2002 | Deacon | |
| 6,393,185 B1 | 5/2002 | Deacon et al. | |
| 6,475,153 B1 | 11/2002 | Khair et al. | |
| 6,516,017 B1 | 2/2003 | Matsumoto | |
| 6,558,335 B1 | 5/2003 | Thede | |
| 6,605,045 B2 | 8/2003 | Ohsaki et al. | |
| 6,628,686 B1 | 9/2003 | Sargent | |
| 6,647,032 B1 | 11/2003 | Lee et al. | |
| 6,661,955 B1 * | 12/2003 | Calvet | G02B 6/3582 |
| | | | 977/932 |
| 6,690,387 B2 | 2/2004 | Zimmerman et al. | |
| 6,690,693 B1 | 2/2004 | Crowder | |
| 6,699,199 B2 | 3/2004 | Asada et al. | |
| 6,788,719 B2 | 9/2004 | Crowder | |
| 6,795,453 B2 | 9/2004 | Pezeskhi et al. | |
| 6,803,604 B2 | 10/2004 | Takahashi et al. | |
| 6,807,206 B2 | 10/2004 | Tuskiji et al. | |
| 6,816,529 B2 | 11/2004 | Vail | |
| 6,829,400 B2 | 12/2004 | Nakano et al. | |
| 6,911,629 B2 | 6/2005 | Lano et al. | |
| 6,915,955 B2 | 7/2005 | Jung | |
| 6,987,906 B2 | 1/2006 | Nakama et al. | |
| 6,990,129 B2 | 1/2006 | Buimovich et al. | |
| 7,015,894 B2 | 3/2006 | Morohoshi | |
| 7,106,778 B2 | 9/2006 | Reid | |
| 7,130,325 B2 | 10/2006 | Oh et al. | |
| 7,184,064 B2 | 2/2007 | Zimmerman et al. | |
| 7,189,011 B2 | 3/2007 | Harker | |
| 7,196,355 B2 | 3/2007 | De La Grandiere et al. | |
| 7,283,242 B2 | 10/2007 | Thornton | |
| 7,394,734 B2 | 7/2008 | Ishimoto et al. | |
| 7,468,637 B2 | 12/2008 | Braun et al. | |
| 7,469,092 B2 | 12/2008 | Sappey et al. | |
| 7,480,317 B2 | 1/2009 | Hu et al. | |
| 7,483,453 B2 | 1/2009 | Diffily et al. | |
| 7,526,007 B2 | 4/2009 | Chua et al. | |
| 7,558,301 B2 | 7/2009 | Lin et al. | |
| 7,616,110 B2 | 11/2009 | Crump et al. | |
| 7,620,078 B2 | 11/2009 | Mori | |
| 7,663,607 B2 | 2/2010 | Hotelling et al. | |
| 7,664,156 B2 | 2/2010 | Yamazaki | |
| 7,701,985 B2 | 4/2010 | Webster et al. | |
| 7,738,935 B1 | 6/2010 | Turcott | |
| 7,751,658 B2 | 7/2010 | Welch et al. | |
| 7,852,898 B2 | 12/2010 | Yokoyama et al. | |
| 7,885,302 B2 | 2/2011 | Eberhard | |
| 7,903,704 B2 | 3/2011 | Patel et al. | |
| 8,000,368 B2 | 8/2011 | Pezeshki | |
| 8,121,169 B2 | 2/2012 | Nguyen et al. | |
| 8,222,084 B2 | 7/2012 | Dallesasse et al. | |
| 8,259,770 B2 | 9/2012 | Tagansky | |
| 8,279,441 B2 | 10/2012 | Brown | |
| 8,320,763 B2 | 11/2012 | Kim et al. | |
| 8,352,008 B2 | 1/2013 | Kuhn et al. | |
| 8,378,811 B2 | 2/2013 | Crump et al. | |
| 8,405,699 B2 | 3/2013 | Niwa et al. | |
| 8,437,825 B2 | 5/2013 | Dalvi et al. | |
| 8,442,608 B2 | 5/2013 | Pav | |
| 8,457,172 B2 | 6/2013 | Reid et al. | |
| 8,479,122 B2 | 7/2013 | Hotelling et al. | |
| 8,588,266 B2 | 11/2013 | Fujii | |
| 8,618,930 B2 | 12/2013 | Papadopoulos et al. | |
| 8,649,839 B2 | 2/2014 | Chin | |
| 8,750,341 B2 | 6/2014 | Bazzani | |
| 8,774,243 B2 | 7/2014 | Kim et al. | |
| 8,781,548 B2 | 7/2014 | Besko et al. | |
| 8,805,129 B2 * | 8/2014 | Han | G02B 6/423 |
| | | | 385/129 |
| 8,886,465 B2 | 11/2014 | Cinbis et al. | |
| 8,954,135 B2 | 2/2015 | Yuen et al. | |
| 8,964,806 B2 | 2/2015 | Ensher et al. | |
| 8,995,483 B2 | 3/2015 | Diehl et al. | |
| 9,065,251 B2 | 6/2015 | Fukuda et al. | |
| 9,093,813 B2 | 7/2015 | Pushkarsky et al. | |
| 9,172,211 B2 | 10/2015 | Kuksenkov et al. | |
| 9,209,602 B2 | 12/2015 | Davies et al. | |
| 9,323,012 B1 * | 4/2016 | Sun | G02B 6/4224 |
| 9,425,365 B2 | 8/2016 | Kurtin | |
| 9,526,421 B2 | 12/2016 | Papadopoulos et al. | |
| 9,526,431 B2 | 12/2016 | Zakharov et al. | |
| 9,529,160 B2 | 12/2016 | Orcutt et al. | |
| 9,543,736 B1 | 1/2017 | Barwicz et al. | |
| 9,577,410 B2 * | 2/2017 | Yamazaki | H01S 5/142 |
| 9,595,804 B2 | 3/2017 | Minneman et al. | |
| 9,755,399 B2 | 9/2017 | Tulip | |
| 9,759,652 B2 | 9/2017 | Yu | |
| 9,780,266 B2 | 10/2017 | Lotito et al. | |
| 9,804,027 B2 | 10/2017 | Fish | |
| 9,829,631 B2 | 11/2017 | Lambert | |
| 9,882,073 B2 | 1/2018 | Krasulick et al. | |
| 9,883,824 B2 | 2/2018 | Tiao | |
| 9,888,838 B2 | 2/2018 | Ito et al. | |
| 9,935,426 B2 | 4/2018 | Kaneko | |
| 9,948,063 B2 | 4/2018 | Caneau et al. | |
| 10,004,408 B2 | 6/2018 | Naima | |
| 10,060,788 B2 | 8/2018 | Fei | |
| 10,078,183 B2 | 9/2018 | Adderly et al. | |
| 10,082,625 B2 * | 9/2018 | Budd | G02B 6/4243 |
| 10,098,555 B2 | 10/2018 | Yamaji | |
| 10,168,497 B2 * | 1/2019 | Merget | G02B 6/423 |
| 10,181,696 B2 | 1/2019 | Evans et al. | |
| 10,215,698 B2 | 2/2019 | Han et al. | |
| 10,319,693 B2 * | 6/2019 | Lambert | H01L 24/92 |
| 10,319,878 B2 | 6/2019 | Ulmer et al. | |
| 10,413,362 B2 | 9/2019 | Griffin | |
| 10,433,739 B2 | 10/2019 | Weekly et al. | |
| 10,535,979 B2 | 1/2020 | Audet et al. | |
| 10,678,005 B2 * | 6/2020 | Kinghorn | G02B 6/4274 |
| 10,687,718 B2 | 6/2020 | Allec et al. | |
| 10,697,830 B1 | 6/2020 | Kangas et al. | |
| 10,710,495 B2 | 7/2020 | Ichikawa et al. | |
| 10,788,368 B1 | 9/2020 | Pelc et al. | |
| 10,852,492 B1 | 12/2020 | Vermeulen et al. | |
| 10,868,407 B2 | 12/2020 | Mathai et al. | |
| 11,158,996 B2 | 10/2021 | Bismuto et al. | |
| 11,171,464 B1 | 11/2021 | Bishop et al. | |
| 11,275,405 B2 | 3/2022 | Hotelling | |
| 11,385,409 B2 * | 7/2022 | Ishikawa | G02B 6/4231 |
| 11,409,059 B1 * | 8/2022 | Vermeulen | G02B 6/4251 |
| 11,437,779 B2 | 9/2022 | Audet et al. | |
| 11,493,705 B2 * | 11/2022 | Shikama | G02B 6/4219 |
| 11,552,454 B1 | 1/2023 | Arbore et al. | |
| 11,644,618 B2 | 5/2023 | Bishop et al. | |

(56) References Cited

U.S. PATENT DOCUMENTS

| | | | | |
|---|---|---|---|---|
| 11,686,906 | B1* | 6/2023 | Venkatesan | G02B 6/4243 |
| | | | | 385/93 |
| 2001/0010743 | A1* | 8/2001 | Cayrefourcq | G02B 6/4232 |
| | | | | 257/E21.705 |
| 2001/0055447 | A1* | 12/2001 | Delprat | G02B 6/4228 |
| | | | | 385/52 |
| 2002/0181521 | A1 | 12/2002 | Crowder et al. | |
| 2004/0126117 | A1 | 7/2004 | Lo et al. | |
| 2004/0174915 | A1 | 9/2004 | Sarlet et al. | |
| 2004/0255318 | A1 | 12/2004 | Braitberg et al. | |
| 2005/0127383 | A1 | 6/2005 | Kikawa et al. | |
| 2005/0169327 | A1 | 8/2005 | Eden et al. | |
| 2006/0088068 | A1 | 4/2006 | Farrell et al. | |
| 2007/0116076 | A1 | 5/2007 | Wang et al. | |
| 2007/0223549 | A1 | 9/2007 | Livshits et al. | |
| 2008/0063016 | A1 | 3/2008 | Bhatia et al. | |
| 2008/0310470 | A1 | 12/2008 | Ooi et al. | |
| 2010/0046562 | A1 | 2/2010 | Donegan et al. | |
| 2013/0292571 | A1 | 11/2013 | Mukherjee et al. | |
| 2016/0296173 | A1 | 10/2016 | Culbert | |
| 2017/0033531 | A1 | 2/2017 | Treese et al. | |
| 2017/0045450 | A1 | 2/2017 | Lieber et al. | |
| 2017/0249445 | A1 | 8/2017 | Devries et al. | |
| 2017/0325744 | A1 | 11/2017 | Allec et al. | |
| 2018/0054038 | A1 | 2/2018 | Kim | |
| 2018/0083421 | A1 | 3/2018 | Audet et al. | |
| 2018/0242892 | A1 | 8/2018 | Schie | |
| 2020/0153202 | A1 | 5/2020 | Audet et al. | |
| 2020/0209477 | A1* | 7/2020 | Shikama | G02B 6/3636 |
| 2020/0227895 | A1 | 7/2020 | Takigawa et al. | |
| 2020/0233159 | A1* | 7/2020 | Chen | G02B 6/4212 |
| 2021/0026066 | A1* | 1/2021 | Barwicz | H01S 5/4056 |
| 2022/0006267 | A1 | 1/2022 | Bismuto et al. | |
| 2022/0046774 | A1 | 2/2022 | Kersey | |
| 2022/0061135 | A1 | 2/2022 | Gu et al. | |
| 2022/0131340 | A1 | 4/2022 | Bishop et al. | |
| 2023/0076055 | A1* | 3/2023 | Vallance | G02B 6/423 |
| 2023/0163573 | A1 | 5/2023 | Arbore et al. | |
| 2024/0113508 | A1 | 4/2024 | Bismuto et al. | |

FOREIGN PATENT DOCUMENTS

| | | |
|---|---|---|
| CN | 1488183 A | 4/2004 |
| CN | 1703783 A | 11/2005 |
| CN | 102522697 | 6/2012 |
| CN | 104393482 | 3/2015 |
| CN | 205680923 U | 11/2016 |
| CN | 14303038 A | 4/2022 |
| DE | 102008014093 A1 | 7/2009 |
| DE | 102010020625 A1 | 11/2022 |
| EP | 0203810 A2 | 12/1986 |
| EP | 1753104 | 2/2007 |
| EP | 2091118 | 8/2009 |
| EP | 2120301 | 11/2009 |
| EP | 2849294 | 3/2015 |
| EP | 2992821 | 3/2016 |
| GB | 2380058 | 3/2003 |
| JP | 04116878 | 4/1992 |
| JP | 2000163031 | 6/2000 |
| JP | 2002342033 | 11/2002 |
| JP | 2005175021 | 6/2005 |
| JP | 2008262116 | 10/2008 |
| JP | 2010503987 | 2/2010 |
| JP | 2015115411 | 6/2015 |
| WO | WO 96/011416 | 4/1996 |
| WO | WO 05/091036 | 9/2005 |
| WO | WO 08/033251 | 3/2008 |
| WO | WO 16/144831 | 9/2016 |
| WO | WO 16/176364 | 11/2016 |
| WO | WO 17/197033 | 11/2017 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Tohmori, et al., "Broad-Range Wavelength-Tunable Superstructure Grating (SSG) DBR Lasers," IEEE Journal of Quantum Electronics, vol. 29, No. 6, Jun. 1993, pp. 1817-1823.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

U.S. Appl. No. 18/094,797, filed Jan. 9, 2023, Arbore et al.
U.S. Appl. No. 18/103,186, filed Jan. 30, 2023, Greening.
U.S. Appl. No. 16/142,676, filed Sep. 26, 2018, Arbore et al.

* cited by examiner

CHIP-TO-CHIP OPTICAL COUPLING FOR PHOTONIC INTEGRATED CIRCUITS

CROSS-REFERENCE TO RELATED APPLICATION

This application is a nonprovisional of, and claims the benefit under 35 U.S.C. § 119(e) of, U.S. Provisional Patent Application No. 63/247,992 filed on Sep. 24, 2021, and entitled "Chip-to-Chip Optical Coupling for Photonic Integrated Circuits," the contents of which are incorporated by reference in their entirety.

TECHNICAL FIELD

Embodiments described herein relate to photonic integrated circuits and, in particular, to systems and methods providing accurate and precise alignment when optically intercoupling photonic circuits defined on separate chips.

BACKGROUND

A photonic integrated circuit can include multiple circuit elements, each formed by different manufacturing processes. Some manufacturing processes are incompatible, so in some cases, a circuit element formed in a first process may be optically and/or mechanically coupled to a second circuit element formed separately in a second process. For example, a laser element formed onto a substrate may be mechanically and optically coupled to a waveguide formed in a separate process onto a different substrate.

However, in many cases, precise mechanical alignment between different components is required for high quality optical coupling between different photonic circuit elements. Precise alignment of small-scale components is difficult, time-consuming, and expensive to achieve.

SUMMARY

Embodiments described herein reference systems and methods for effective precise and accurate lateral and vertical alignment between elements (and in particular optical axes of optical elements) of different chips, each comprising at least one photonic element of a photonic circuit. In one example, an input/output facet of a first waveguide formed/defined on a first chip may be optically coupled to an input/output facet of a second waveguide formed/defined on a second chip. In such constructions, precise mutual alignment of the input/output facets, in all axes, may be required for optimal optical coupling between the first waveguide and the second waveguide.

More generally, as known to a person of skill in the art, different photonic elements may be manufactured in different conditions and/or with different processes. Some such processes may be incompatible with one another. For example, temperatures required to anneal a silicon waveguide may be incompatible with semiconductor elements, conductive layers, and/or functional layers of a photodiode or light emitting element, such as a laser. As a result, a photonic integrated circuit that requires multiple discrete photonic elements may require mechanical assembly of different parts, manufactured using different processes.

In such examples, embodiments described herein define multidimensional alignment guides by leveraging highly repeatable and highly accurate photolithography operations. More specifically, two chips—each having defined respectively thereon at least one photonic circuit element—can be precisely aligned with one another (and optically intercoupled; optical axes of different elements can be precisely aligned) by defining, from each chip, at least one alignment guide also referred to herein as a "surface feature." Surface features of each chip can be defined to complement one another; a surface feature that extends proud of a surface of one chip may be configured to engage with and extend into a surface feature that extends into a surface of a second chip.

For example, some embodiments described herein reference a photonic integrated circuit formed by bonding two separate chips together. A first substrate can have defined thereon a first photonic element and a second substrate can have defined thereon a second photonic circuit element. Each of the chips can include respective surface features configured to engage with corresponding surface features of the opposite substrate. For example, the first substrate may include two channels, oriented at different angles that are configured to engage with two protrusion of the other substrate oriented in the same manner. As a result of these and other described constructions, the two chips can be accurately mechanically aligned, thereby optically intercoupling (aligning optical axes) the first photonic element with the second photonic element.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
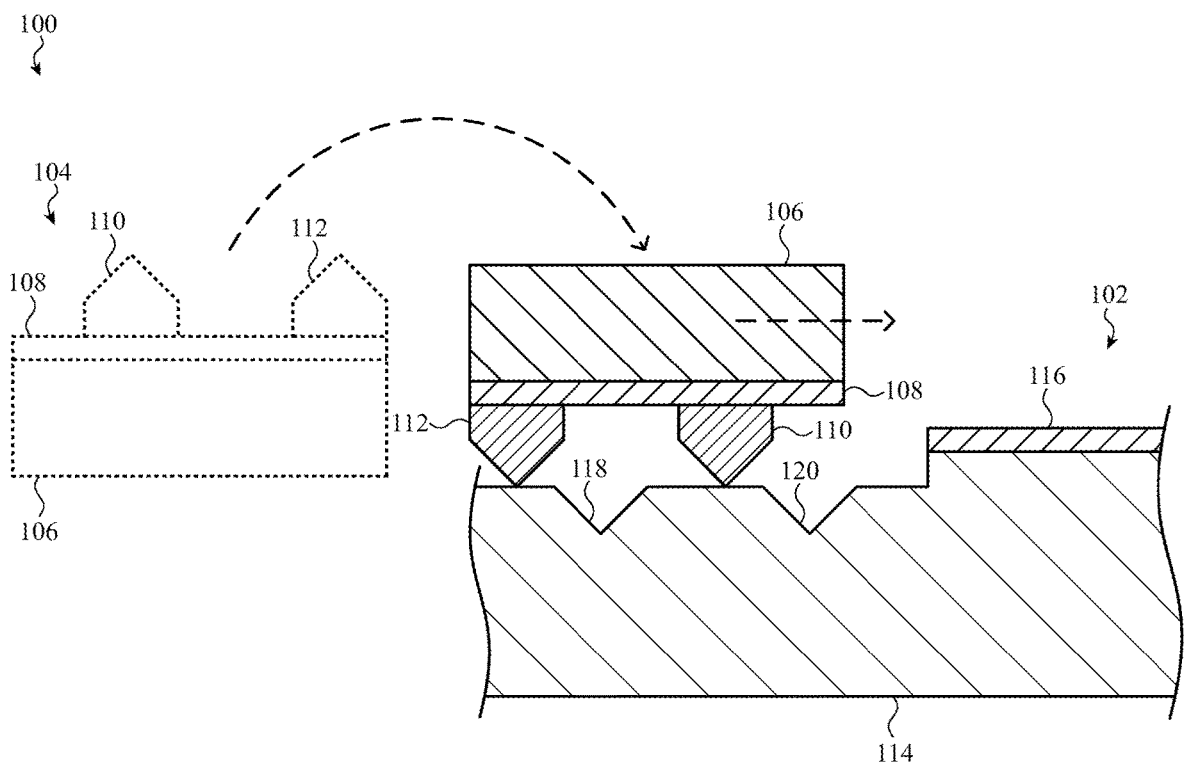
FIGS. 1A-1B depict a simplified cross-section diagram of an operation of aligning two photonic circuit chips by leveraging complementary geometry, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein are directed to systems and methods for defining photonic integrated circuits. A photonic integrated circuit, as described herein, can be architected for any suitable computational, imaging, information transfer, or other purpose. As known to a person of skill in the art, a photonic integrated circuit can include a number of elements, including, but not limited to, lasers, photodiodes, interferometers, waveguides, lenses, polarization filters, polarizers, couplers, and so on.

In many cases, a photonic circuit element may be manufactured using a process specific to that photonic circuit element. For example, manufacturing processes necessary to define a light source (such as a laser) are necessarily different from manufacturing processes necessary to define a silicon or silicon nitride waveguide. Continuing the example, metallic and/or conductive layers of the laser may be incompatible with temperatures necessary to anneal the silicon waveguide. Manufacturing temperature is merely one example incompatibility; it may be appreciated that many different photonic circuit element manufacturing processes may include one or more operations that are incompatible with one another.

To account for manufacturing incompatibilities, among other reasons, it is often the case that a photonic integrated circuit includes components that are separately manufactured on different chips and, thereafter, assembled together. In many cases, such manufacturing/assembly techniques are referred to as "flip-chip" designs in which one chip is positioned over as second chip and coupled thereto to define a single circuit.

However, conventional flip-chip techniques require mechanical relative alignment between chips, which may be particularly challenging for small-scale chips, such as those that may include a limited number of photonic integrated circuit elements. As a result, conventional flip-chip manufacturing requires high alignment tolerance. For photonic integrated circuits, high alignment tolerances may not be suitable for reliably, repeatably, and precisely optically coupling together two or more singulated chips, each including one or more phonic integrated circuits.

For example, among other issues, flip-chip bonding of two chips can introduce lateral and/or vertical misalignment of certain circuit elements. As one non-limiting example, standoffs or posts that attach and/or offset flip-chip bonded chips set Z-axis (e.g., vertical) alignment but do not assist in X-Y (e.g., lateral) alignment. Further, the vertical alignment guiding as provided by standoffs or posts of conventional methods may only provide vertical alignment accuracy or precision within manufacturing tolerances of the standoffs or posts.

For photonic circuits, relative misalignment of chips may be particularly problematic. For example, in conventional flip-chip implementations in which a first chip includes a first waveguide and a second chip includes a second waveguide, relative three dimensional alignment between the first and second waveguides cannot be ensured. In particular, lateral misalignment may lead to loss of light transmitted from the first waveguide to the second waveguide, and thus to power loss for the overall photonic integrated circuit. The same is true, although often to a lesser extent, for vertical misalignment between chips and their component waveguides.

To account for these and other drawbacks of conventional flip-chip manufacturing techniques, embodiments described herein reference systems and methods for leveraging photolithography (and similar high-precision manufacturing techniques) to define complementary geometry on different chips to be coupled via a flip-chip methodology. The complementary geometry can be used as an alignment guide for two or three dimensions of relative alignment. As a result of systems and methods described herein, two or more chips including complementary geometry can be relatively aligned with the same accuracy and precision as the photolithography process that was leveraged to define the complementary geometry on each chip. As used herein the phrase "complementary geometry" refers generally to tongue-in-groove mating structures; one structure typically extends proud of a surface and another structure typically defines a cavity extending into a different surface. Complementary structures can have the same cross-sectional profile or different cross-sectional profiles.

For example, a first substrate can be used as a base substrate to form a light source that provides optical power to a photonic integrated circuit, collectively defining a first chip. The photonic integrated circuit and/or the light source can be optically coupled to other photonic circuit elements disposed on the base substrate. For example, the light source may be optically coupled to a waveguide that defines an input/output facet.

A second substrate can be used as a base substrate to form a waveguide configured to direct light emitted from the light source (e.g., via the first waveguide) to another circuit element of the same photonic integrated circuit, collectively defining a second chip. As noted above, process steps required to manufacture a light source may be thermally incompatible with process steps required to manufacture an annealed waveguide on the second substrate. As a result, the light source, the first waveguide, and the first substrate (the first chip) may be manufactured separately from the second waveguide and the second substrate (the second chip). In this example embodiment, during manufacturing of the light source, one or more surface features can be formed on, formed into, and/or defined from the first substrate during a photolithography process also used to define one or more features of the light source itself. As a result, a single photolithographic process defines positioning of both the light source and each individual surface feature.

Similarly, the waveguide of this example can be manufactured on the second substrate. A photolithography process leveraged to define geometry of the waveguide can be also used to define two or more surface features on the second substrate that complement the surface features of the first substrate. In a more general phrasing, a single manufacturing step can be used to define multiple functional elements on a chip, including channels or protrusion that may, in later manufacturing steps (following singulation, in some examples) be used for alignment guiding purposes as described herein. These operations may be selected in certain embodiments so that size and shape of different structures formed onto and/or into different substrates can be defined with the precision of a single photolithography step.

As a result of this construction, the surface features of each chip can be used as interlocking/intercoupling/mating alignment guides that, when engaged, provide precise threedimensional alignment of the light source and an input facet of the optical waveguide.

Surface features as described herein can be formed in a number of suitable ways. For example, in some embodiments, an anisotropic etch process may be used to define a linear channel and/or a linear protrusion, each having a cross-sectional profile having a rectangular shape. In other cases, a directional etch process may be used to define a channel with a triangular cross-sectional profile and, correspondingly, a protrusion having a triangular cross-sectional profile each extending for a distance in a linear manner. In other cases, a protrusion may have a rectangular cross-section, whereas a channel corresponding to the protrusion may have a triangular profile; each can extend along a linear path. In other cases, a linear path may not be required; curved paths may be possible in some examples. In these examples, protruding surface features can be configured to interlock with a corresponding, and complementary channel surface feature. In another phrasing, an embossed surface feature can be configured to engage with a debossed surface feature.

In many embodiments, multiple surface features are formed onto (or into, or disposed on, or formed from) a single chip so as to constrain motion and/or position of that chip in multiple dimensions when the chip is positioned relative to another chip having complementary geometry. For example, a first channel defined into a substrate surface can be oriented along a first axis and a second channel defined into the same substrate surface can be oriented along a second axis perpendicular to the first axis. In other cases, two or more channels can overlap, so as to define a cross-shape, an L-shape, or an X-shape. Many configurations are possible.

In some embodiments, debossed surface features may have a different cross-sectional profile geometry than complementary embossed surface features. For example, a channel with a triangular cross-sectional profile (e.g., formed with a directional etch process) may be wider than a complementary protrusion that also has a triangular cross-sectional profile. In other cases, a protrusion may have a rectangular cross-sectional profile, and may be configured to align within a channel having a triangular cross-sectional profile.

In some cases, multiple channels can be aligned in parallel, with different depth, length, or cross-sectional profile geometry. Rectilinear channels may not be required; channels can bow, arch, or otherwise curve or have multiple differently-oriented discrete portions. In some examples, channels of different size can be used to progressively align two chips together. In other cases, a channel may not have a single width and may instead be constructed with a tapered width that can be used to guide alignment of a second substrate toward a narrow end of the channel.

These foregoing and other embodiments are discussed below with reference to FIGS. 1A-8. However, those skilled in the art will readily appreciate that the detailed description given herein with respect to these figures is for explanation only and should not be construed as limiting.

Figure 1B:
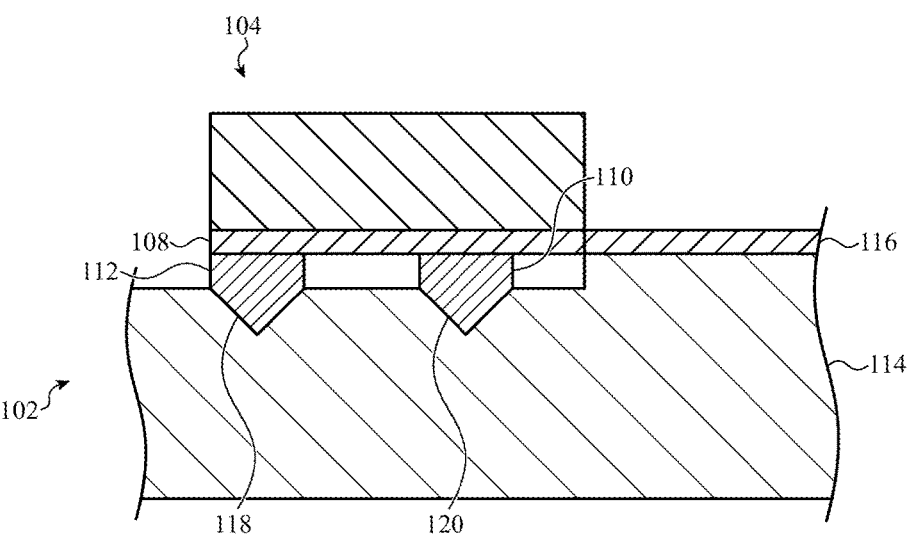

FIGS. 1A-1B depict a simplified cross-section diagram of an operation of aligning two photonic circuit chips by leveraging complementary geometry, such as described herein.

In particular, FIG. 1A depicts a diagram of a portion of a photonic integrated circuit 100 that is defined at least in part by two chips that can be assembled and intercoupled by leveraging a flip-chip technique, as described herein. In particular, a first chip 102 can serve as a base substrate over which a second chip 104 can be positioned.

The first chip 102 and the second chip 104 can each include different photonic circuit elements that may require precise multi-axis alignment. More specifically, the photonic circuit elements of each chip may require precise alignment along an X axis (e.g., from right to left of FIG. 1A), along a Y axis (e.g., into or out of FIG. 1A), and along a Z axis (e.g., from top to bottom of FIG. 1A). In this example, the X and Y axes can define a surface plane of the first chip 102 and the Z axis can extend through a thickness of the first chip 102. Misalignment of the two photonic circuit elements may result in substantial optical power loss and/or low coupling efficiency which, in turn, can affect and degrade performance of the photonic integrated circuit 100.

As with other embodiments described herein, the first chip 102 and the second chip 104 each are formed with complementary geometry that, when mutually engaged, precisely aligns the first chip 102 with the second chip 104.

For example, in some embodiments, the second chip 104 can include a light source intended to be optically coupled to a waveguide defined on or through the first chip 102. This is merely one example; it may be appreciated that either chip can include one or more passive or active optical elements or photonic elements or semiconductor circuit elements that, in turn may be configured to align with a corresponding optical coupling or conductive coupling of the other chip. For simplicity of description, the embodiments that follow reference intercoupled chips that include a single photonic circuit element coupling to a single photonic circuit element, but it may be appreciated that this is merely one example, and that other architectures and implementations can leverage embodiments described herein.

In this example, the second chip 104 includes a base substrate 106 over which at least a portion of a photonic integrated circuit element 108 may be formed (e.g., a light source). In some cases, the base substrate 106 is formed form silicon (e.g., bulk silicon) although this may not be required of all embodiments.

The second chip 104 can also define at least two protrusions, identified as the protrusions 110 and 112. In this example, the protrusions 110 and 112 are show as extending from a surface of the photonic integrated element 108, but this may not be required of all embodiments. For example, in some cases, the protrusions 110, 112 can be formed from a surface of the base substrate 106. In further cases, one or more protrusions and/or one or more channels may be formed on, disposed on, or otherwise formed from the same base substrate of the same chip. More specifically, a single chip can include both protrusions and channels configured to mate with corresponding protrusions and channels of another chip.

The protrusions 110, 112 are shown with identical cross-sectional profiles, but this may not be required of all embodiments. For example, in some cases, the protrusion 110 may be shorter along the Z-axis than the protrusion 112, the protrusion 110 may be deeper along the Z-axis than the protrusion 112. In other cases, the protrusion 110 may have a circular cross section/profile, whereas the protrusion 112 may have a triangular or otherwise polygonal cross section. A person of skill in the art may readily appreciate that any suitable arrangement and geometry of the protrusions 110, 112 may be used.

The first chip 102, similar to the second chip 104, can include a base substrate 114. The base substrate 114 may be formed from silicon, although this is not required of all embodiments.

The base substrate 114 can have formed (or disposed, placed, and so on) thereon at least a portion of a photonic circuit element 116 (e.g., a waveguide). As noted above, the photonic circuit element 116 may be configured to precisely align with the photonic circuit element 108 when the second chip 104 is positioned over and aligned with the first chip 102. More specifically, an optical axis (light emitting axis, input facet, output facet, and so on) of the photonic circuit element 116 may be configured to precisely align with the photonic circuit element 108. In one example construction, the photonic circuit element 116 may be a first waveguide and the second photonic circuit element 108 may be a second waveguide.

To effect such alignment, the base substrate 114 includes at least two channels, identified as the channels 118 and 120. In this example, the channels 118 and 120 are show as extending from a surface of the base substrate 114, but this may not be required of all embodiments. For example, in some cases, the protrusions 110, 112 can be formed from a surface of the photonic integrated circuit element 116.

As may be appreciated by a person of skill in the art, the channels 118, 120 and the protrusions 110, 112 can be formed with complementary geometry such that when the second chip 104 is positioned over the first chip 102, and the second chip 104 is advanced in the XY plane, the protrusions 110, 112 can become engaged with the channels 118, 120 and the triangular geometry of the channels 118, 120 can guide the protrusion 110, 112 to a specific Z position, thereby precisely aligning the photonic circuit element 116 and the photonic circuit element 108. More broadly, the dual alignment channel geometry illustrated in FIGS. 1A and 1B provides for alignment along all three primary axes, namely the X-axis, the Y-axis and the Z-axis.

These foregoing embodiments depicted in FIGS. 1A-1B and the various alternatives thereof and variations thereto are presented, generally, for purposes of explanation, and to facilitate an understanding of various configurations and constructions of a method of aligning two chips to form a photonic integrated circuit, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, FIGS. 2A-2D depict example views of a chip as described herein that can be formed with a set of surface features that may be leveraged with complementary geometry of corresponding surface features of a second chip to precisely align with that chip, such as described herein.

Figure 2A:
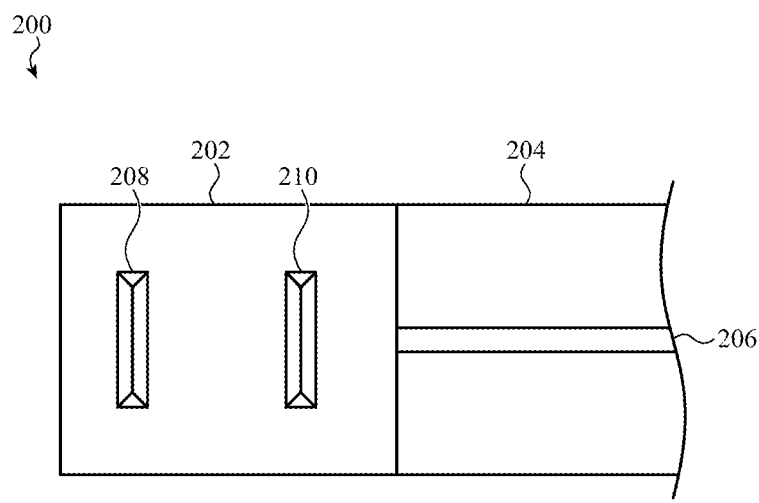
FIGS. 2A-2D depict example views of a substrate as described herein that can be formed with a set of surface features that may be leveraged with complementary geometry of a second substrate to precisely align with that substrate, such as described herein.

For example, FIG. 2A depicts a view of a chip 200 that includes a base layer 202 onto which one or more features can be formed that, in turn, can define at least a portion of a photonic integrated circuit, such as described herein. For example, the chip can include an elevated portion 204 that supports a waveguide 206 that can define an input/output edge facet configured to optically and/or mechanically couple to an input/output edge facet of another waveguide formed/defined on a separate substrate.

Adjacent to or otherwise separated from the elevated portion 204, can be defined two or more surface features, identified as the surface feature 208 and the surface feature 210. The surface feature 208 and/or the surface feature 210 can be formed into or out of an upper surface of the base layer 202. More generally, the surface feature 208 and/or the surface feature 210 may be embossed features or debossed features; the surface feature 208 and/or the surface feature 210 may define one or more channels or may define one or more protrusions.

The surface feature 208 and/or the surface feature 210 can exhibit any suitable cross-sectional profile or geometry. In the illustrated example, the surface feature 208 and/or the surface feature 210 each have a triangular cross-sectional profile that may be formed via photolithographically-masked directional etch or anisotropic etch processes. This is merely one example cross-sectional profile; in other examples, a surface feature as described herein can be formed to have any suitable shape.

In the illustrated example, the surface feature 208 and the surface feature 210 have a generally rectilinear shape, and are arranged in parallel to one another. This is not required of all embodiments, for example in FIG. 2B, the surface feature 210 may be oriented at an angle perpendicular to the surface feature 210.

Figure 2B:
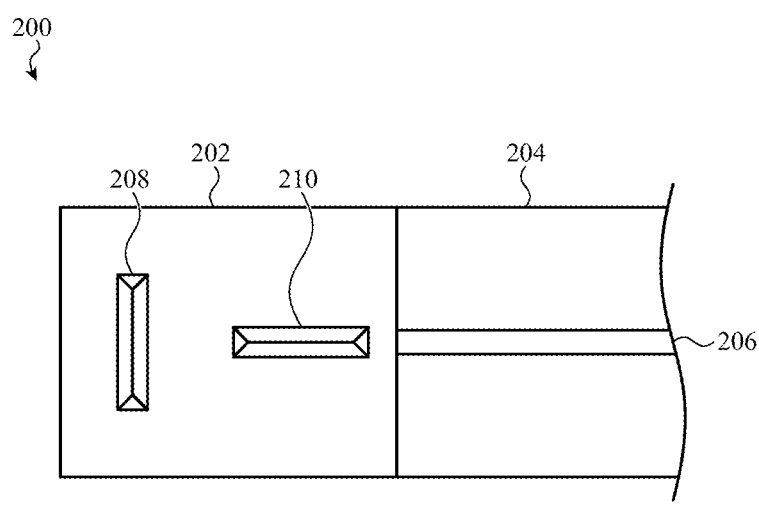
Figure 2C:
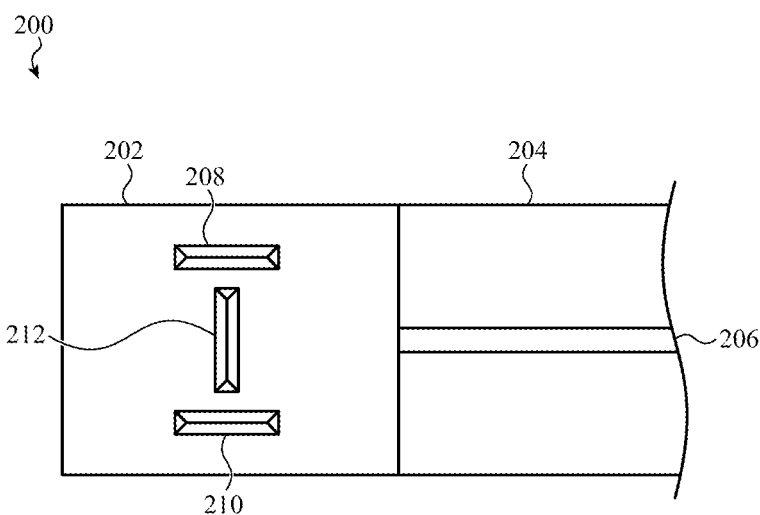

In the examples illustrated in FIGS. 2A-2B, the surface feature 208 and the surface feature 210 are shown as the only two surface features defined onto the chip 200; this is not required of all embodiments. For example, as shown in FIG. 2C, more than two surface features can be defined. More particularly, in this example, a third surface feature 212 is defined between the surface feature 208 and the surface feature 210.

Figure 2D:
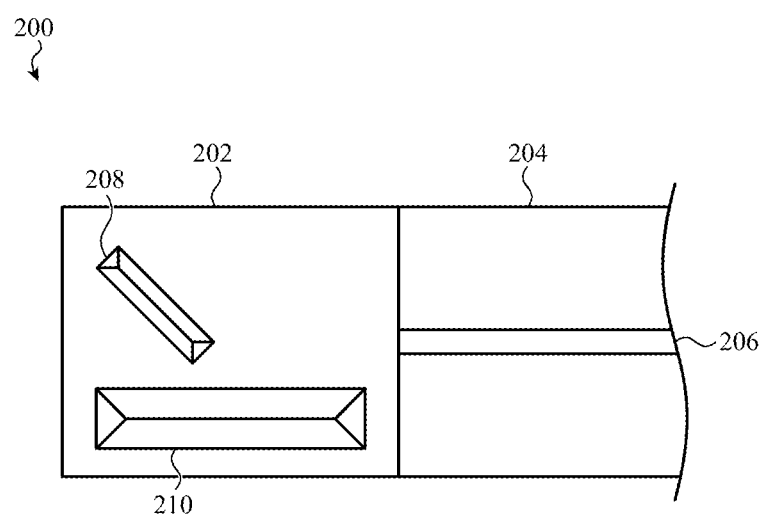

In the examples illustrated in FIGS. 2A-2C, each surface feature—whether embossed or debossed from a surface or layer of the chip 200 is shown as having the same size and cross-sectional profile. This is not required of all embodiments. For example, as shown in FIG. 2D, the surface feature 208 and the surface feature 210 may have different sizes and/or may be arranged at an oblique angle relative to one another. In this example, the surface feature 210 is depicted has larger than the surface feature 208, which in turn is oriented at a non-parallel, non-perpendicular, oblique angle relative to the surface feature 210.

Each of the example embodiments depicted in FIGS. 2A-2D illustrate example possible geometries of surface features that may be formed into a chip, such as the first chip 102 or the second chip 104 of FIGS. 1A-1B. More generally, for these embodiments show in FIGS. 2A-2D, it may be appreciated that a similar pattern to that which is shown can be formed into a second chip or chip in order that the chip 200 can be coupled to and precisely aligned with the other chip.

These foregoing embodiments depicted in FIGS. 2A-2D and the various alternatives thereof and variations thereto are presented, generally, for purposes of explanation, and to facilitate an understanding of various configurations and constructions of a method of defining and/or positioning surface features onto a chip for aligning that chip with another chip having complementary geometry to form a photonic integrated circuit, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
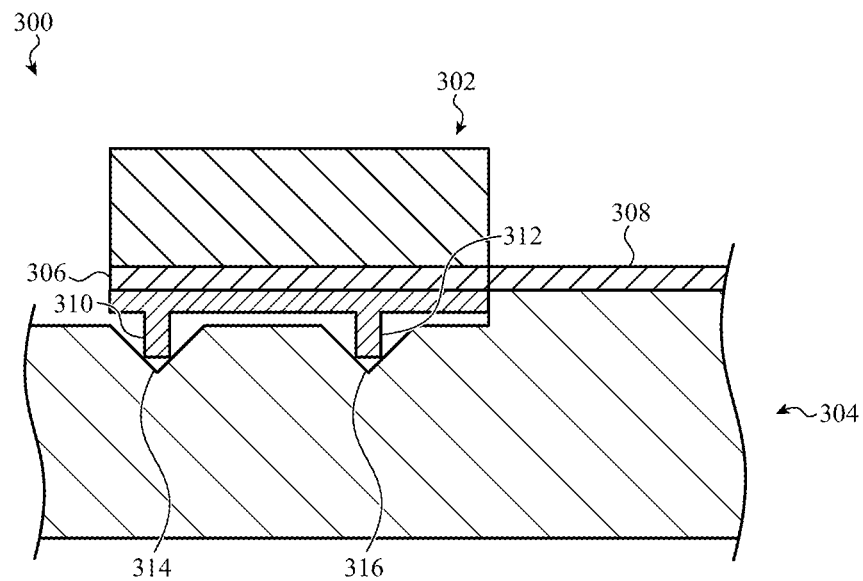
FIG. 3 depicts a simplified cross-section diagram of a pair of photonic circuit chips aligned by leveraging complementary geometry, such as described herein.

For example, in many embodiments, a surface feature extending proud of a surface configured to mate with and/or interface with a surface feature defining a channel may have different cross-sectional profiles. For example, FIG. 3 depicts a simplified cross-section diagram of a pair of photonic circuit chips aligned by leveraging complementary geometry, such as described herein.

In this embodiment, a photonic integrated circuit 300 can be formed by mating a first chip 302 with a second chip 304. The first chip includes a first circuit element 306 (e.g., waveguide, light source, splitter, delay line, Bragg reflector, other reflectors, mode field converters, and so on) may be aligned with a second circuit element 308 of the second chip 304 when surface features of the first and second chips are engaged.

More particularly, in the illustrated embodiment, the first chip 302 includes a surface feature 310 and a surface feature 312, each having a rectangular cross-section. Correspondingly, the second chip 304 includes a surface feature 314 and a surface feature 316, each having a triangular cross-section. In this example, the surface feature 310 may be configured to mate with and/or engage with the surface feature 314 and the surface feature 312 may be configured to mate with and/or engage with the surface feature 316.

Figure 4:
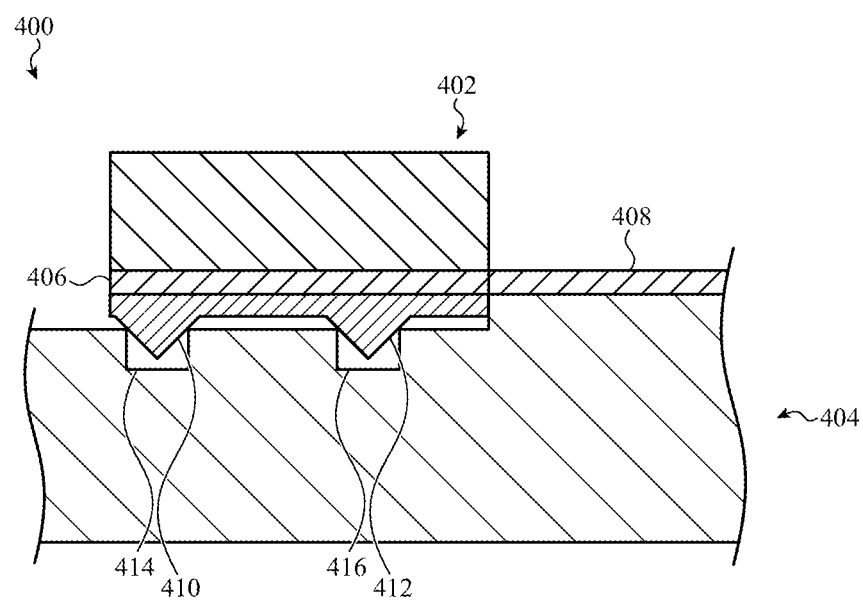
FIG. 4 depicts another simplified cross-section diagram of a pair of photonic circuit chips aligned by leveraging complementary geometry, such as described herein.

In other cases, protrusions can have a triangular cross-sectional profile and channels, as described herein, can have a different cross-sectional profile. For example, FIG. 4 depicts another simplified cross-section diagram of a pair of photonic circuit chips aligned by leveraging complementary geometry, such as described herein.

In this embodiment, a photonic integrated circuit 400 can be formed by mating a first chip 402 with a second chip 404. The first chip includes a first circuit element 406 that may be aligned with a second circuit element 408 of the second chip 404 when surface features of the first and second chips are engaged.

More particularly, in the illustrated embodiment, the first chip 402 includes a surface feature 410 and a surface feature 412, each having a triangular cross-section. Correspondingly, the second chip 404 includes a surface feature 414 and a surface feature 416, each having a rectangular cross-section. In this example, the surface feature 410 may be configured to mate with and/or engage with the surface feature 414 and the surface feature 412 may be configured to mate with and/or engage with the surface feature 416.

Figure 5:
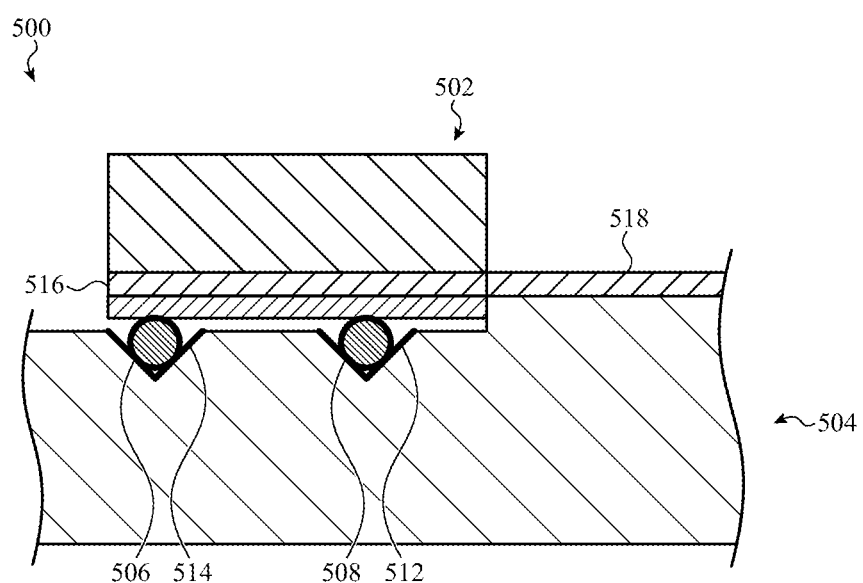
FIG. 5 depicts another simplified cross-section diagram of a pair of photonic circuit chips aligned by leveraging complementary geometry, such as described herein.

In yet further examples, mating of surface features as described herein can serve a functional purpose, in addition to a mechanical and/or alignment purpose. For example, FIG. 5 depicts a simplified cross-section diagram of a pair of photonic circuit chips aligned by leveraging complementary geometry, such as described herein.

In this embodiment, a photonic integrated circuit 500 can be formed by mating and conductively coupling a first chip 502 with a second chip 504. More particularly, in the illustrated embodiment, the first chip 502 includes a surface feature 506 which may be a solder ball or other conductive surface. The first chip may also include a surface feature 508, which may also be a solder ball or other conductive surface. Each of the surface features 506, 508 can have a circular or curved cross-section, but this is not required of all embodiments.

As with other embodiments described herein, the second chip 504 includes a surface feature 512 and a surface feature 514, each having a triangular cross-section. In this example, the surface feature 508 may be configured to mate with and/or engage with the surface feature 512 and the surface feature 506 may be configured to mate with and/or engage with the surface feature 514. In this embodiment, the conductive surface features of each chip (which can extend into the surface features 512, 514) can form a conductive coupling between the chips, electrically coupling semiconductor circuitry defined thereon or therein. In addition, as with other embodiments described herein, the surface features may provide for precise alignment of photonic integrated circuit elements, such as an element 516 of the first chip and an element 518 of the second chip.

These foregoing embodiments depicted in FIGS. 2A-5 and the various alternatives thereof and variations thereto are presented, generally, for purposes of explanation, and to facilitate an understanding of various configurations and constructions of a method of defining and/or positioning surface features onto a chip for aligning that chip with another chip having complementary geometry to form a photonic integrated circuit, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, more generally and broadly, it may be appreciated that photonic circuit elements formed on different chips can be aligned and/or mechanically, optically, and/or electrically coupled to one another.

It may be appreciated that complementary geometry defined in part by photonic circuit element manufacturing operations can be defined in any number of suitable ways. In some examples, different channels and corresponding protrusions can intersect. In some cases, channels and protrusions can be disposed parallel to one another and perpendicular to an optical axis of a photonic component of one phonic integrated circuit defined on a chip. In other cases, a single chip can include at least one channel feature and at least one protruding feature.

In some cases, a channel can have a tapering geometry to encourage particular alignment by sliding a protruding feature into the tapering channel. In this manner, optical components formed onto, into, or otherwise disposed on each respective chip can be aligned so as to share a common optical axis. In other cases, channels may have keyed depth so that optical alignment will only be achieved if particular protrusions are aligned with particular channels.

Figure 6:
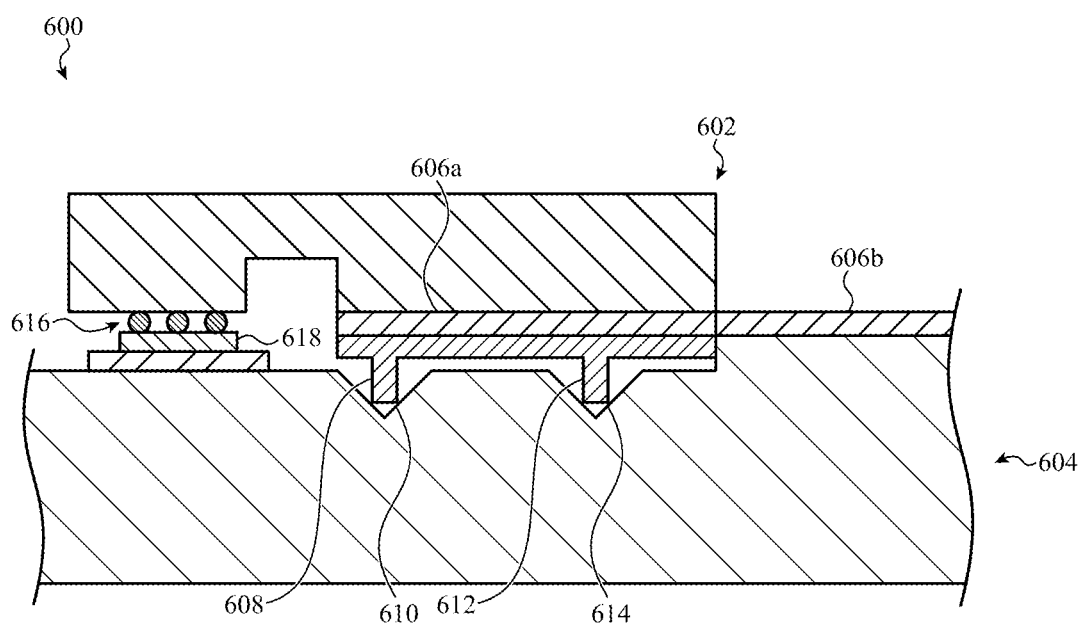
FIG. 6 depicts another simplified cross-section diagram of a pair of photonic circuit chips aligned by leveraging complementary geometry, such as described herein.

In yet further examples, an alignment structure as described herein can be used to align both a semiconductor circuit and a photonic circuit, each formed onto and/or defined onto respective chips. For example, FIG. 6 depicts another simplified cross-section diagram of a pair of photonic circuit chips aligned by leveraging complementary geometry, such as described herein. In this example, a photonic integrated circuit 600 includes a first chip 602 disposed over a second chip 604. The first chip 602 and the second chip 604 are aligned in part by complementary geometry, as described herein. More specifically, a photonic circuit element 606a of the first chip 602 can be aligned with a second photonic circuit element 606b of the second chip 604.

As with other embodiments described herein, the alignment can be effected by mating and/or engagement of surface features of the first chip 602 and the second chip 604. In particular, the first chip 602 can include a protrusion 608 that mates with a channel 610 of the second chip 604. In addition, the first chip 602 can include a second protrusion 614 that mates with a channel 612 of the second chip 604.

In addition to optical coupling between the photonic circuit element 606a and the photonic circuit element 606b, the first chip 602 and the second chip 604 can be conductively coupled in one or more suitable locations to conductively intercouple silicon circuitry, either digital or analog, of the respective chips. For example, solder balls 616 can conductively couple conductive pads or traces of the first chip 602 with a circuit or circuit element 618 of the second chip 604. More specifically the solder balls 616 can facilitate one or more electrical connections between the first chip 602 and the second chip 604; in some cases, the solder balls may be reflowed or otherwise melted in a manufacturing step in order to conductively and mechanically couple the first and second chips to one another.

It may be appreciated, more generally and broadly, that other constructions of a multi-chip architecture as described herein can emit light and/or receive light in any suitable position or location; in some cases, the circuit element 618 can be configured to emit light or receive light, for example.

These foregoing embodiments depicted in FIGS. 2A-6 and the various alternatives thereof and variations thereto are presented, generally, for purposes of explanation, and to facilitate an understanding of various configurations and constructions of a method of defining and/or positioning surface features onto a chip for aligning that chip with another chip having complementary geometry to form a photonic integrated circuit, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it may be appreciated that any structure as shown in these figures and/or described herein can be formed onto any suitable base substrate. After complementary features are defined on separate chips, at least one of the chips may be flipped and/or otherwise positioned onto a second chip, after which an alignment between the two chips may be guided through three dimensions.

In other cases, a channel as described herein may be both embossed and debossed. For example, regions around a channel can be etched away such that the channel is defined at least in part by sidewalls that extend proud of a substrate surface.

Figure 7A:
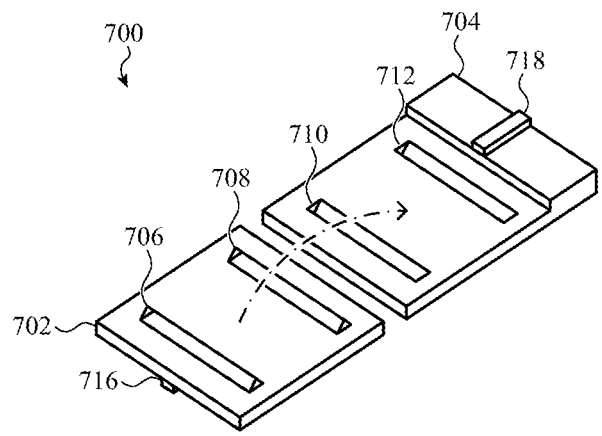
FIGS. 7A-7C depict progressive relative alignments of a pair of photonic circuit chips aligned by leveraging complementary geometry, such as described herein.
Figure 7B:
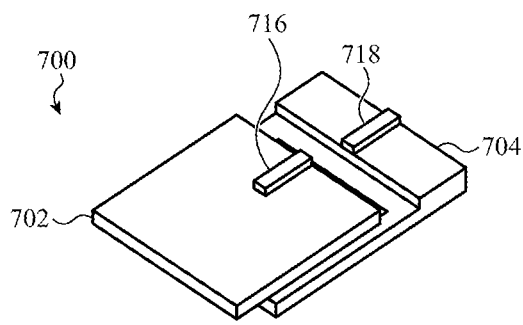
Figure 7C:
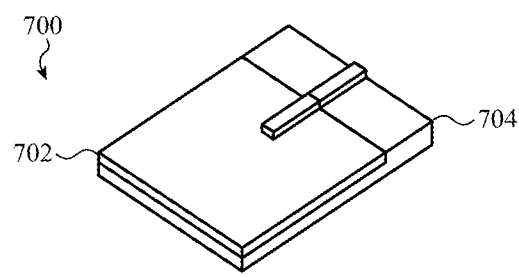

FIG. 7A depicts a first stage of defining a bonded flip-chip structure, as described herein. In particular, a set of separately manufactured chips 700 may include a first chip 702 and a second chip 704. The first chip, as with other embodiments described herein can include a first surface feature 706 and a second surface feature 708, each of which extend from a surface of the first chip 702. In a complementary manner, the second chip 704 can include a first surface feature 710 and a second surface feature 712 that are respectively configured to mate with and engage with the first surface feature 706 and the second surface feature 708. As a result of this set of complementary geometries, the first chip 702 can be flipped/inverted onto the second chip 704 so as to effect precise alignment (lateral and vertical) between a first photonic circuit element 716 defined on the first chip 702 and a second photonic circuit element 718 defined on the second chip 704, such as shown in FIG. 7B. After inversion of the first chip 702 onto the second chip 704, the first chip 704 may be mechanically guided (e.g., via pick and place machine, manually, by vibration, and so on) such that the respective surface feature of each chip are engaged, such as shown in FIG. 7C.

Figure 8:
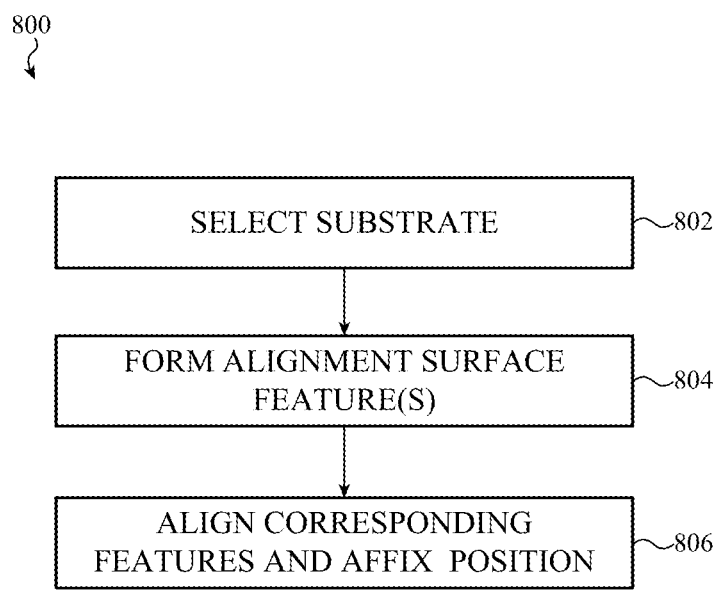
FIG. 8 is a flowchart depicting example operations of a method of aligning chips, such as described herein.

FIG. 8 is a flowchart depicting example operations of a method of aligning chips, such as described herein. In this embodiment, the method 800 includes operation 802 at which a chip is selected. Thereafter, at operation 804, two or more alignment features can be formed into or onto the chip. Finally, at operation 806, the chip can be aligned with corresponding features of another chip, and the two chips can be affixed to one another in a suitable manner.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A photonic integrated circuit comprising:
    a first chip defining a first surface and comprising:
        a first surface feature extending from the first surface and having a first triangular cross-sectional profile extending along a first direction and defining a first conductive surface;
        a second surface feature extending from the first surface and having a second triangular cross-sectional profile extending along a second direction different from the first direction and defining a second conductive surface; and
        a first photonic circuit element disposed on the first chip and defining an optical axis; and
    a second chip defining a second surface and comprising:
        a third surface feature defined into the second surface and engaged with the first surface feature;
        a first conductive layer disposed over the third surface feature and conductively coupled to the first conductive surface;
        a fourth surface feature defined into the second surface and engaged with the second surface feature;
        a second conductive layer disposed over the fourth surface feature and conductively coupled to the second conductive surface; and
        a second photonic circuit element disposed on the second chip, aligned with the optical axis, and optically coupled to the first photonic circuit element.

2. The photonic integrated circuit of claim 1, wherein the first chip and the second chip are formed from silicon.

3. The photonic integrated circuit of claim 1, wherein: the third surface feature has a third triangular cross-sectional profile smaller than the first triangular cross-sectional profile.

4. The photonic integrated circuit of claim 1, wherein the third surface feature has a rectilinear cross-sectional profile oriented along the first direction.

5. The photonic integrated circuit of claim 1, wherein the first photonic circuit element comprises a laser light emitting element.

6. The photonic integrated circuit of claim 5, wherein the second photonic circuit element comprises a waveguide.

7. A method of manufacturing a photonic integrated circuit, the method comprising:
    forming a first channel having a first triangular cross-sectional profile into a first chip comprising a first photonic circuit element;
    forming a second channel into the first chip, the second channel having a second triangular cross-sectional profile at a perpendicular angle relative to the first triangular cross-sectional profile of the first channel;
    disposing a first conductive layer over the first channel;
    disposing a second conductive layer over the second channel;
    forming a first protrusion from a second chip comprising a second photonic circuit element;
    forming a second protrusion from the second chip, the second protrusion offset by the angle from the first protrusion;
    disposing a third conductive layer over the first protrusion;
    disposing a fourth conductive layer over the second protrusion; and
    aligning the first photonic circuit element with the second photonic circuit element by aligning the first chip with the second chip such that:
        the first protrusion extends into the first channel;
        the second protrusion extends into the second channel;
        the first conductive layer conductively couples to the third conductive layer; and
        the second conductive layer conductively couples to the fourth conductive layer.

8. The method of claim 7, wherein the first channel is formed, at least in part, by a photolithography process.

9. The method of claim 8, wherein the second channel is formed, at least in part, by the photolithography process.

10. The method of claim 8, wherein the photolithography process comprises an anisotropic etch or a directional etch.

11. The method of claim 8, wherein the first protrusion and the second protrusion are formed, at least in part, by the photolithography process.

12. The method of claim 7, wherein the first channel and the first protrusion have complementary geometry.

13. The method of claim 7, wherein the second channel and the second protrusion have complementary geometry.

14. A photonic integrated circuit comprising:
    a first chip defining a first surface and comprising:
        a first channel defined into the first surface and having a first triangular cross-sectional profile and defining a first conductive surface;
        a second channel defined into the first surface and perpendicular to the first channel and having a second triangular cross-sectional profile perpendicular to the first triangular cross-sectional profile and defining a second conductive surface; and
        a first photonic circuit element disposed on the first chip; and
    a second chip defining a second surface and comprising:
        a first protrusion extending from the second surface, engaging the first channel and conductively coupling to the first conductive surface;
        a second protrusion extending from the second surface, engaging the second channel and conductively coupling to the second conductive surface;
        a second photonic circuit element disposed on the second chip and optically coupled to the first photonic circuit element as a result of engagement between the first and second channels and the first and second protrusions, respectively.

15. The photonic integrated circuit of claim 14, wherein the first chip is mechanically coupled to the second chip.

* * * * *